US007906866B2

(12) United States Patent
Anghel et al.

(10) Patent No.: US 7,906,866 B2
(45) Date of Patent: Mar. 15, 2011

(54) AC/AC POWER CONVERTER FOR AIRCRAFT

(75) Inventors: Cristian E. Anghel, Oro Valley, AZ (US); Mingzhou Xu, Oro Valley, AZ (US)

(73) Assignee: Honeywell International Inc., Morristown, NJ (US)

( * ) Notice: Subject to any disclaimer, the term of this patent is extended or adjusted under 35 U.S.C. 154(b) by 224 days.

(21) Appl. No.: 12/101,864

(22) Filed: Apr. 11, 2008

(65) Prior Publication Data
US 2009/0256419 A1    Oct. 15, 2009

(51) Int. Cl.
*B60L 1/00* (2006.01)
(52) U.S. Cl. .......................... 307/9.1; 307/10.1
(58) Field of Classification Search .................. None
See application file for complete search history.

(56) References Cited

U.S. PATENT DOCUMENTS

| | | | |
|---|---|---|---|
| 4,833,588 A | 5/1989 | Schauder | |
| 5,669,470 A * | 9/1997 | Ross | 191/10 |
| 6,018,233 A | 1/2000 | Glennon | |
| 6,771,524 B2 * | 8/2004 | Miguchi | 363/149 |
| 6,826,065 B2 | 11/2004 | Chekhet et al. | |
| 2003/0179594 A1 * | 9/2003 | Bruckmann et al. | 363/132 |
| 2003/0205983 A1 * | 11/2003 | Kahlon et al. | 318/727 |
| 2004/0169489 A1 * | 9/2004 | Hobbs | 320/104 |
| 2007/0159121 A1 * | 7/2007 | Maikawa et al. | 318/140 |
| 2007/0189044 A1 | 8/2007 | Liu et al. | |
| 2008/0051949 A1 * | 2/2008 | Seo et al. | 701/22 |
| 2008/0211437 A1 * | 9/2008 | Tamai et al. | 318/148 |
| 2008/0285314 A1 * | 11/2008 | Kojori | 363/37 |

OTHER PUBLICATIONS

Ito, English abstract of JP pub 2006/020384, Jan. 19, 2006.*
Ajiguchi, English abstract of JP pub 2003/259647, Sep. 12, 2003.*
Shi, Research on a Novel Capacitor Clamped Multilevel Matrix Converter, Sep. 2005.*
AC_AC Power Conversion Based on Matrix Converter Topology with Unidirectional Switches, Kim et al., Feb. 2000.*

* cited by examiner

*Primary Examiner* — Jared J Fureman
*Assistant Examiner* — Justen Fauth
(74) *Attorney, Agent, or Firm* — Oral Caglar, Esq.

(57) ABSTRACT

A matrix converter circuit having two AC/AC matrix converters coupled in parallel in a first mode to power a starter and decoupled in a second mode to each power separate functions used in aircraft power applications. Three common functional modes include 1) start mode with two matrix converters operating in parallel powering the starter, 2) a motor mode where one matrix converter powers a motor, and 3) a constant frequency power mode where the other matrix converter provides constant frequency AC power.

11 Claims, 5 Drawing Sheets

AC/AC POWER CONVERTER FOR AIRCRAFT

BACKGROUND OF THE INVENTION

The present invention generally relates to apparatus in a architecture for converting variable frequency alternating current (AC) electrical power to controlled frequency AC electrical power, and, more specifically, to an apparatus for performing and controlling the AC-AC power conversion to supply power to aircraft systems.

An aircraft electrical architecture that uses electric power for engine starting, for the Environmental Control System (ECS), or to supply constant frequency to loads requires a number of components to perform the AC-DC and controlled DC-AC power conversion. The components required to perform the AC-DC power conversion, which may include components such as Transformer-Rectifiers or Auto-Transformers-Rectifiers (ATRU), together with the controlled DC-AC conversion components such as Inverters and the required contactors, add weight and complexity to the aircraft.

Weight is always at a premium in aircraft designs. Any reduction in weight is an important design consideration in aircraft systems and components. This is especially true in newer designs of unmanned aerial vehicles (UAV), where weight reduction is an important design consideration and carries considerable mission and performance enhancement. All aircraft designs benefit from any reduction in weight.

One prior art solution is disclosed in FIG. 1, which shows a conventional prior art AC-DC conversion circuit. A power supply circuit 100 includes an AC-DC conversion circuit 101 which includes several components. Three phase AC power supply 130 supplies power to an AC bus 135. The AC bus 135 distributes power to an AC/AC converter circuit 101 and starter/generator (S/G) 140. The AC-AC converter circuit 101 includes an AC-DC converter circuit 105 that converts input AC power to DC power. The AC-DC converter circuit 105 includes a rectifier (not shown) supplying rectified DC power to a high voltage DC (HVDC) bus 110 via a bank of capacitors (not shown) used as filters. The HVDC bus 110 is coupled to the AC-DC converter circuit 105 and used to distribute the output HVDC. The HVDC bus 110 couples to a DC-AC converter circuit 115, which converts the DC power to controllable frequency power. The different components are coupled using contactors 120 in the circuit. The AC-DC converter includes bulky Transformer-Rectifiers (TRs) (not shown) or Auto-Transformers-Rectifiers (ATRUs) (not shown). Bulky capacitors at the input of the inverters perform the filtering required for the AC/DC conversion. The TRs, ATRUs, and contactors add bulk, weight, and cost to the electrical circuit.

The switch 125 controls power flow to either a motor 145 or a starter/generator 140. In position B, the switch 125 connects power to the starter/generator 140 to allow high power flow for starter operation. When switch 125 is in position A, power from the starter/generator 140, when in generator operation, flows through the converter circuit 101 to provide power with controllable frequency to the motor 145.

Prior art attempts using diode fed converters to perform the AC conversion required DC link capacitors. These capacitors add weight and cost to the converter circuit and are heat sensitive.

Under current applications, an aircraft architecture that uses electric power for engine starting, for the Environmental Control System (ECS) or to supply constant frequency to loads requires a number of components to perform the AC/DC and controlled DC/AC power conversion adding weight, bulkiness, and cost to the overall aircraft design.

As can be seen, there is a need for an improved power architecture that performs power conversion to provide controlled variable frequency and constant frequency power at a reduced weight and cost compared to prior art systems. The controlled variable frequency delivered by the architecture is variable frequency controlled by the architecture.

SUMMARY OF THE INVENTION

In one aspect of the present invention, a power converter circuit for delivering power comprises a matrix converter circuit coupled to a power supply in a first mode, the first mode powering a starter/generator operating as a starter for an engine; the matrix converter circuit coupled to the starter/generator functioning as a generator providing internal power in a second mode, the second mode providing power from the starter/generator operating as a generator; a switch having a first position and a second position, the first position allowing power to flow through the matrix converter circuit in a forward direction in the first mode from the power supply and the second position allowing power to flow through the matrix converter circuit in a reverse direction in the second mode from the starter/generator; and the power converted to a controlled frequency power after flowing through the matrix converter circuit.

In another aspect of the present invention, a circuit for converting variable or constant frequency power comprises two matrix converters coupled together in parallel to receive power flow from a power supply in a forward direction, the matrix converters delivering controlled frequency power to a starter/generator to operate the starter/generator as a starter; and the two matrix converters decoupled to receive power flow from the starter/generator operating as a generator providing power in a reverse direction, with one matrix converter delivering constant frequency power for a first function and the other matrix converter delivering controlled frequency power for a second function.

In a further aspect of the present invention, a matrix converter circuit producing controlled frequency power comprises a first matrix converter converting variable or constant frequency power delivered by an electric component functioning as a generator in a first mode to deliver constant frequency power for a first function; a second matrix converter converting variable or constant frequency power delivered by the electric component functioning as a generator in a first mode to deliver controlled frequency power for a second function; and the first and second matrix converter converting power from an external power supply in a second mode to deliver controlled frequency power to the electric component functioning as a starter, the first and second matrix converter coupled in parallel to deliver power.

These and other features, aspects, and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention can be used in any conventional power system application requiring an AC-DC conversion and controlling the DC-AC power conversion. The invention is especially useful for aircraft power systems used for engine starting, for powering the Environmental Control System (ECS), aircraft system motors, for supplying controlled (variable) frequency power, or constant frequency power (typically 400 Hz).

For the AC/AC conversion implemented by using a matrix converter (MC), many bulky components are eliminated. By using MCs, bulky ATRUs as used in the prior art are eliminated as well as the large capacitance at the input of the inverters performing the DC/AC inversion. This use of MCs improves reliability, reduces weight and bulkiness, and simplifies circuit design.

Another advantage of the AC/AC converters in the improved architecture of the present invention is bi-directional AC power flow which simplifies the system architecture. Prior art voltage source inverters are a mature technology. All these prior art inverters basically require two steps for conversion. In a first step, a three-phase line voltage is rectified to feed a capacitor bank. In a second step this DC voltage is inverted to create a three-phase output voltage.

Figure 1:
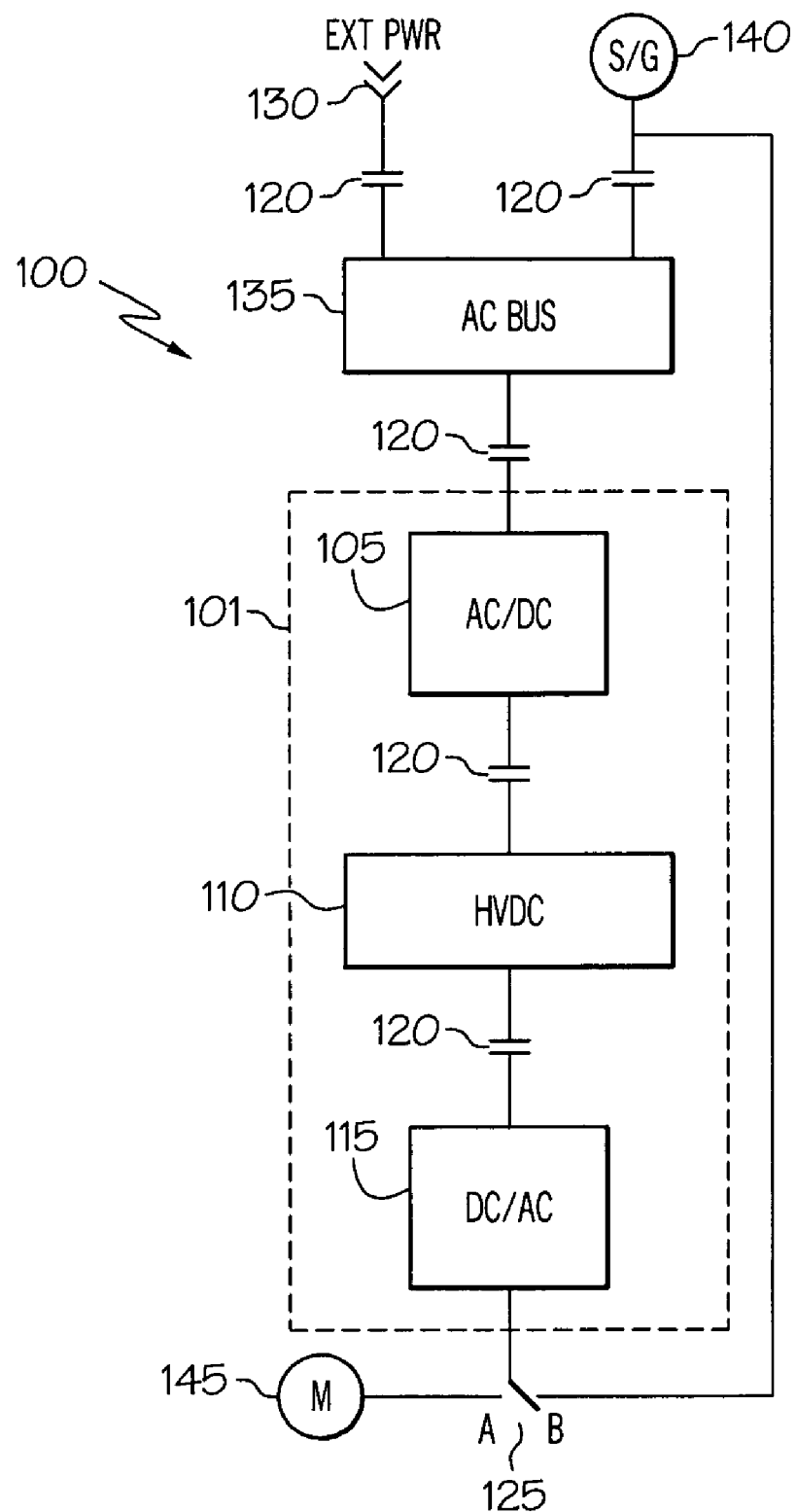
FIG. 1 shows a prior art embodiment of an AC-DC power converter circuit.
Figure 2:
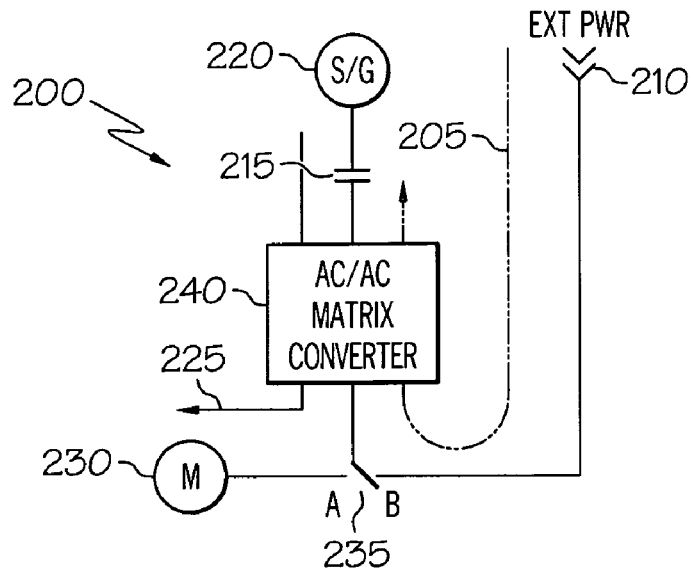
FIG. 2 shows a first circuit schematic for an AC-AC conversion circuit in accordance with an embodiment of the present invention.

FIG. 2 shows an exemplary embodiment of the invention. An AC/AC converter circuit 200 may provide both starter and motor AC power. Start power flow 205 may be selected to power a starter/generator that can be employed as a start motor or a generator (S/G) 220. The start power may be provided in the form of constant frequency power (e.g. by an auxiliary power unit (APU) or an external power supply) or variable frequency power (e.g. by another starter/generator) as an external power supply 210. External power supply 210, in the form of three-phase constant frequency AC, may be routed to the starter/generator 220 using switch 235 set on position B. This setting may cause power flow 205 as shown. From switch 235, power may go through an AC/AC matrix converter 240 to the starter/generator 220. A contactor 215 may provide circuit connection allowing power flow. The AC/AC matrix converter 240 may convert the three-phase power from constant frequency external power 210 AC to controlled (variable) frequency power used for engine start.

After engine start and power up, the power system may be switched to internal power by changing the switch 235 to position A. This may change the system to motor power flow 225 as shown. The motor power flow 225 may be supplied by the starter/generator (S/G) 220 operating as a generator and may go through the contactor 215 to enter AC/AC matrix converter 240. Power flow 225 may exit the AC/AC matrix converter 240 to pass through switch 235 in position A to enter motor (M) 230. Again, the AC/AC matrix converter 240 may convert variable frequency power from AC produced by the starter/generator 220 to provide controlled frequency power to the motor 230.

Figure 3:
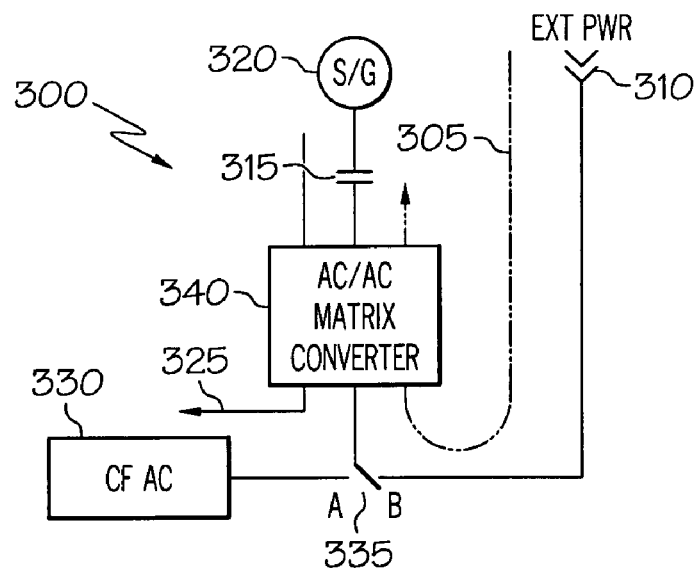
FIG. 3 shows a second circuit schematic for an AC-AC conversion circuit in accordance with an embodiment of the present invention.

FIG. 3 shows another exemplary embodiment of the invention. An AC/AC converter circuit 300 may provide both starter and motor AC power. Start power flow 305 may be selected to power a starter/generator that can be employed as a start motor or a generator (S/G) 320. The start power may be provided in the form of constant frequency power (e.g. by an auxiliary power unit (APU) or an external power supply) or variable frequency power (e.g. by another starter/generator) as an external power supply 310. External power supply 310, in the form of three-phase constant frequency AC, may be routed to the starter/generator 320 using switch 335 set on position B. This setting may cause power flow 305 as shown. From switch 335, power may go through an AC/AC matrix converter 340 to the starter/generator 320. A contactor 315 may provide circuit connection allowing power flow. The AC/AC matrix converter 340 may convert the three-phase power from constant frequency external power 310 AC to controlled (variable) frequency power used for engine start. Three-phase variable frequency AC power may be utilized instead of the external power supply 310.

After engine start and power up, the power system may be switched to internal power by changing the switch 335 to position A. This may change the system to power flow 325 as shown. The power flow 325 may be supplied by a generator 320, and may go through the contactor 315 to enter AC/AC matrix converter 340. Power flow 325 may exit the AC/AC matrix converter 340 to pass through switch 335 in position A to supply the constant frequency AC bus 330. Typically this frequency is 400 Hz. The AC/AC matrix converter 340 may convert variable frequency power from AC produced by the generator 320 to constant frequency AC and provide constant frequency AC power to the constant frequency AC bus 330. The AC/AC matrix converter 340 may also convert variable frequency power from AC produced by the generator 320 to controlled frequency power.

Figure 4:
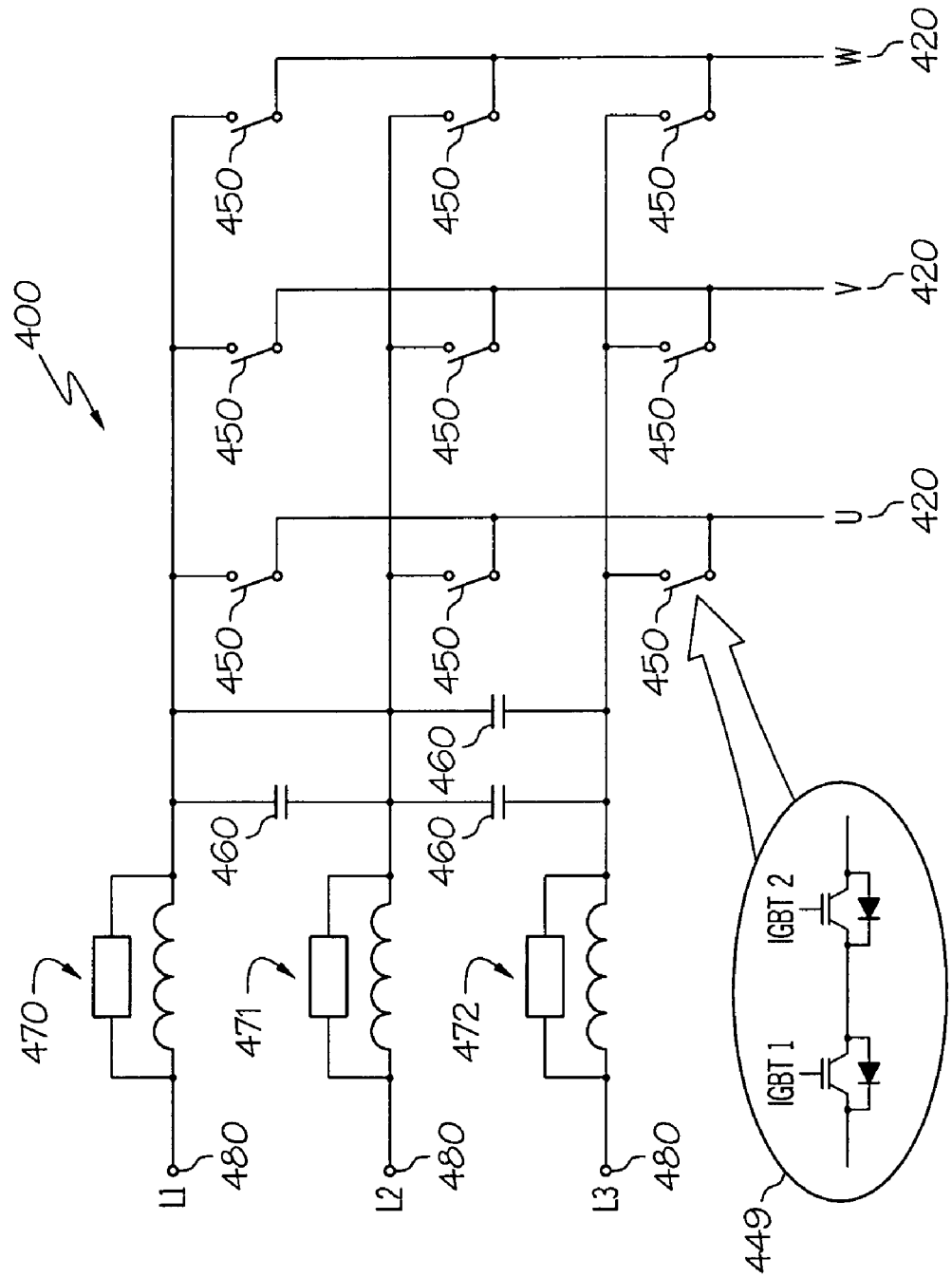
FIG. 4 shows a circuit schematic for a matrix converter in accordance with an embodiment of the present invention.

FIG. 4 shows a circuit schematic for an AC/AC matrix converter compatible with the invention. The AC/AC matrix converter 400 may include three-phase power input to obtain the pulse width modulated AC power of constant frequency useable in aircraft power systems. Each of the inputs/outputs 480 may be connected to include a parallel resistor-inductor (RL) circuit 470, 471, and 472 connected in series. The RL circuits 470, 471, and 472 may filter out certain frequency components to provide improved power quality input/output. The circuit 400 may also incorporate three parallel capacitors 460 that may be connected in parallel to link the three RL circuit 470, 471, and 472 inputs/outputs 480, which may further filter out frequency components.

From the parallel capacitors 460 circuit, power may enter a nine switch array that uses nine connection points to nine-bidirectional switches 450. Each switch 450 may be formed by two power semi-conductors, typically Insulated Gate Bipolar Transistors (IGBT) 449 connected in series. The inputs/outputs 480 may also operate to let current flow in both directions. The inputs/outputs 420 may provide three phase AC power to a nine bidirectional switch 450 matrix, each of which may be constructed using two insulated-gate bipolar transistor power semi-conductors (IGBT) 449 connected in series. The matrix converter is based on the principle that at any time, one of the input lines has the voltage required for a power width modulated (PWM) power signal to provide the controlled (constant) frequency at the output line. Therefore, to get the desired power signal output, it may only be necessary to connect the output to the right input having desired voltage at any one time. Each power input/output 420 may be combined to yield the desired power signal.

Each switch 450 may need to conduct current in both directions and the nine switches 450 may maybe modulate to produce the output power either at 480 or 420. The matrix of nine bidirectional switches 450 may be connected in a 3×3 matrix or array as shown and may link the switches 450 to the inputs/outputs 480 or 420. This may require using the nine bidirectional switches 450 to conduct in either direction with the two power semi-conductors IGBT 449 operating to let current flow in both directions.

The nine switches 450 of the matrix converter 400 may modulate the output voltage and may deliver only sinusoidal currents and voltages, creating only low input harmonics. This cannot be achieved with diode fed inverters in the prior art. In contrast to diode fed inverters, the matrix converter 400 may also offer full regenerating capability, and another advantage of the matrix converter is the lack of DC link capacitors, as these components are spacious and relatively heavy.

Figure 5:
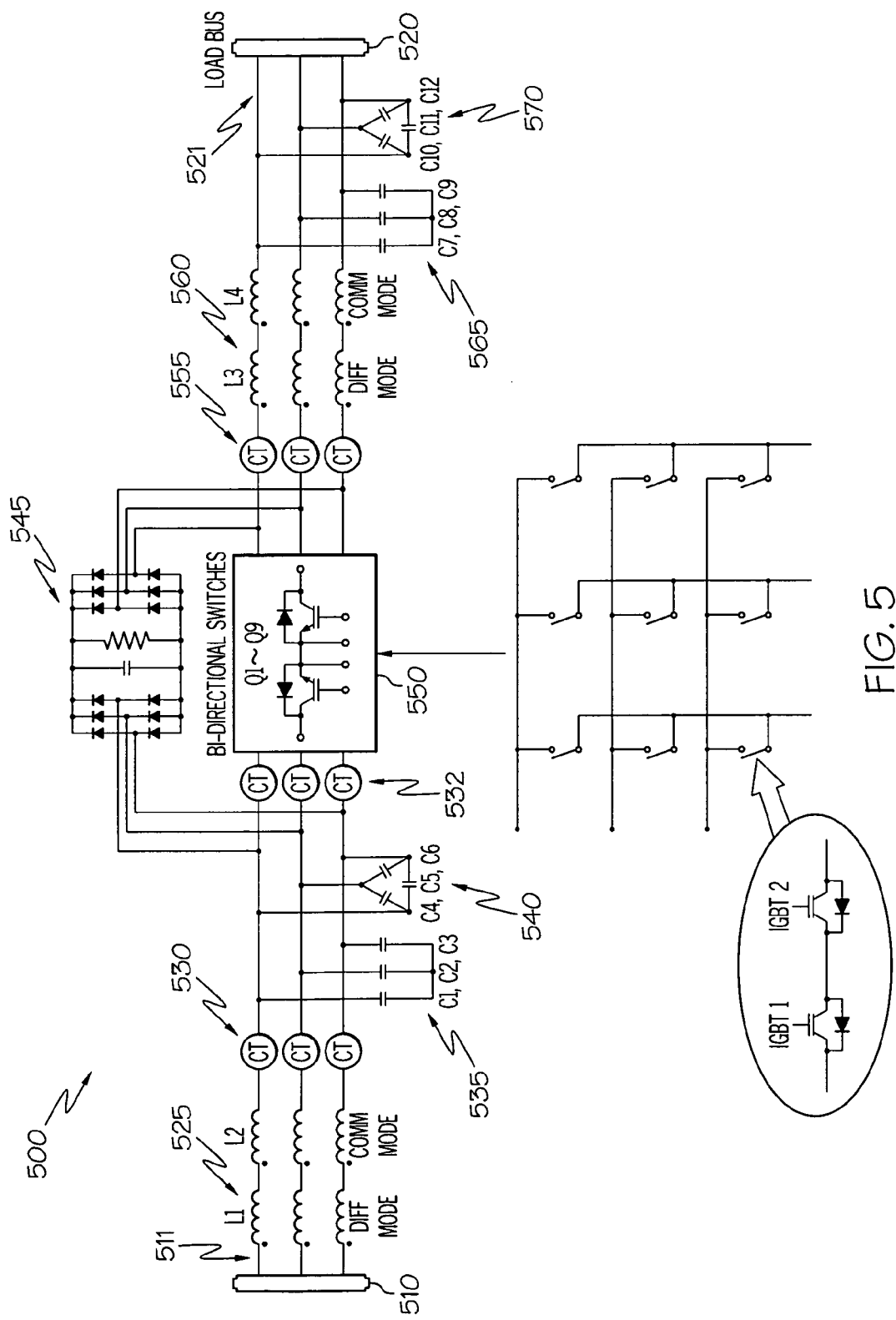
FIG. 5 shows another circuit schematic for a matrix converter in accordance with an embodiment of the present invention.

FIG. 5 shows another exemplary embodiment of an AC/AC matrix converter circuit 500 compatible with the invention. The input/output lines 511 and 521 of the AC/AC matrix converter (MC) 500 may be either load bus 510 or 520. The power flow may be filtered using differential mode and common mode LC filters 525 and 560. The input filters, either LC filter 525 or LC filter 560 depending on selected direction of power flow, may be needed to ensure that the power quality of the input voltage and current is maintained within limits typically obtained with the previously used prior art equipment such as 18 pulse ATRUs.

The LC filters 525 and 560 may be coupled to three parallel connected capacitors 535 and 565 that may connect all three input/output lines 510 or 520 together. The three input/output lines 521 may be parallel coupled to a triangular array of capacitors 540 and 570 that may form connection points at each apex that the three input/output lines 511 and 521 may connect. The triangular array of capacitors 540 and 570 may also filter out certain frequencies in the output signal. Current Transformers (CT) 530, 532, and 555 may measure current in the input/output lines 511 and 521. The input/output lines 511 and 521 may enter a matrix converter 550 and a rectifier 545. Power may flow in either direction depending on the connection mode and function.

This matrix converter circuit (MC) 500 may be used to function in three modes. First, during start mode the MC 500 receives power from an external power or an auxiliary power unit may supply controlled power to the starter generator that may function as a starter and may start the main engine as shown in FIG. 2 and 3. Second, during generate mode the MC 500 may receive power from the generator and may convert/supply power to the large motors in the environmental control system (ECS) such as shown in FIG. 2. Third, during generate mode the MC 500 may receive power from the generator and may convert/supply this power to constant frequency power (typically 400 Hz) required by certain motors and loads as shown in FIG. 3. This method may also permit the MC 500 to operate with either constant frequency (CF) or variable frequency (VF) input power, thus allowing the optimum generating system for a given architecture.

Figure 6:
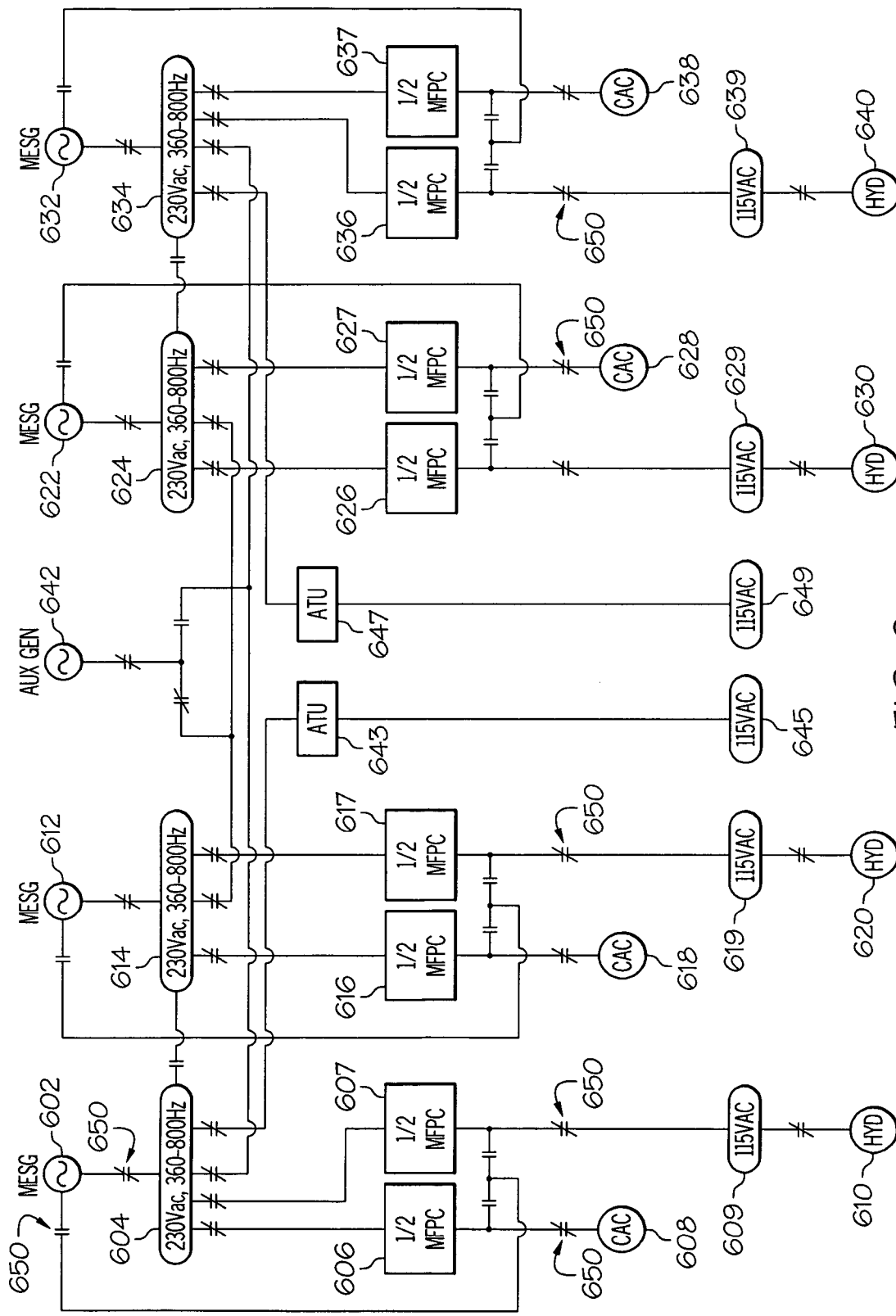
FIG. 6 shows a circuit schematic for an aircraft electrical system employing the matrix converter invention in accordance with an embodiment of the present invention.

FIG. 6 shows an exemplary electric power system architecture for airplanes using the AC/AC matrix converter circuit 600. A first main engine starter/generator (MESG) 602 may be coupled to AC power bus 604 and may be connected to parallel multiple function power controllers (MFPC) 606 and 607, which may include an AC/AC matrix converter. The MFPC 606 may be connected to a motor for the Cabin Air Compressor (CAC) 608 part of the ECS system. The MPFC 607 may be coupled to a 115 volt AC bus 609, which in turn is may be coupled to a hydraulic pump motor (HYD) 610. Contactors 650 may connect the power components.

A second main engine starter/generator (MESG) 612 may be coupled to AC power bus 614 and may be connected to parallel multiple function power controllers (MFPC) 616 and 617, which may include a matrix converter. The MFPC 616 may be connected to a motor for the Cabin Air Compressor (CAC) 618. The MPFC 617 may be coupled to a 115 volt AC bus 619, which in turn may be coupled to a hydraulic pump motor (HYD) 620. Contactors 650 may connect the power components.

A third main engine starter/generator (MESG) 622 may be coupled to AC power bus 624 and may be connected to parallel multiple function power controllers (MFPC) 626 and 627, which may include a matrix converter. The MFPC 626 may connect to a motor for the Cabin Air Compressor (CAC) 628. The MPFC 627 may be coupled to a 115 volt AC bus 629, which in turn may be coupled to a hydraulic pump motor (HYD) 620. Contactors 650 may connect the power components.

A fourth main engine starter/generator (MESG) 632 may be coupled to AC power bus 634 and may be connected to parallel multiple function power controllers (MFPC) 636 and 637, which may include a matrix converter. The MFPC 636 may be connected to a motor for the Cabin Air Compressor (CAC) 638. The MPFC 637 may be coupled to a 115 volt AC bus 639, which in turn may be coupled to a hydraulic pump motor (HYD) 640. Contactors 650 may connect the power components.

Auxiliary generator 642 may be connected to the bus corresponding to MESG 602, 612, 622, and 632. AC power bus 614 and 624 can be connected together. AC power bus 604 and 634 can be connected together. AC power bus 604 and 614 may also be connected together, and similarly AC power bus 624 and 634 may also be connected together. AC power bus 604 may be connected to auto transformer unit (ATU) 643 and then AC power supply 645, and AC power bus 634 may be connected to ATU 647 and then AC power bus 649. The external starting power may be connected to the either AC power bus 643 or 649. Contactors 650 may connect the power components.

In starting operations, the two MPFCs in parallel, MFPC 606 and 607, MFPC 616 and 617, MFPC 626 and 627, and MFPC 636 and 637, may be coupled together using contactors and may power main engine starters/generators MESG 602, 612, 622, and 632. After start, the two MPFCs in parallel, MFPC 606 and 607, MFPC 616 and 617, MFPC 626 and 627, and MFPC 636 and 637 may be decoupled by opening the contactors. The MESG 602, 612, 622, and 632 may be switched to each MFPC 606 and 607, MFPC 616 and 617, MFPC 626 and 627, and MFPC 636 and 637 as shown to separately power different components. By employing two "halves" (½) of a "full size" MFPC 606 and 607, MFPC 616 and 617, MFPC 626 and 627, and MFPC 636 and 637, each may be smaller than a single MFPC required for starter operation, achieving significant weight savings. The weight savings may be realized because after engine start (when two ½ MFPC are used in parallel) each ½ may be used for different functions such as (1) driving the CAC 608, 618, 628, and 638 or (2) supplying 115V power for the hydraulic pump 610, 620, 630, and 640. Although multiple CACs and pumps are shown, there may be only a single CAC and hydraulic pump with multiple connections as shown.

In summary, in the architecture of FIG. 6 the matrix converter may have three operating modes. First, in a first mode, or start mode, when two MCs operating in parallel connection receive power from the external power or the auxiliary power unit and supplies controlled (variable) power to the starter/generator, the starter/generator may function as a starter to start the main engine delivering power increasing from zero Hz to the starter generator. This first mode may deliver power flow toward the starter/generator operating as a starter. Power may be supplied by an external power source with either constant frequency or by another generator with variable frequency power. Second, in a second mode, or controlled frequency power mode, after the engine start one of the MCs that was used during start in parallel may drive the CAC of the ECS, e.g. CAC mode function. Third, in a third mode, after the engine start, the other MC that was also used during start in parallel may supply 400 Hz constant frequency; e.g. static inverter mode function.

In the second and third mode, power may flow from the starter/generator operating as a generator in the reverse direction compared to the first mode. In this reverse direction, the MC input power may be supplied by the generator (with variable frequency) or by the external power source (with constant frequency). Thus, input power to the MC may be at constant frequency (from external power) or variable frequency (from another starter/generator) when the MC is in first mode. Input power to the MC may be at variable frequency when the starter/generator supplies the power or constant frequency power (from external power) when the MC is in second and third mode. Thus, the MC may convert constant or variable frequency power into controlled frequency power that can be constant at 400 Hz when desired (e.g. third mode). The output power may also be used to power a hydraulic pump as shown in FIG. 6.

It should be understood, of course, that the foregoing relates to exemplary embodiments of the invention and that modifications may be made without departing from the spirit and scope of the invention as set forth in the following claims.

We claim:

1. An electric power circuit for converting variable or constant frequency power in an aircraft, comprising:
    a starter/generator of the aircraft;
    two bidirectional AC/AC matrix converters selectively coupled together in parallel with contactors to receive power flow from a power supply in a forward direction, said matrix converters delivering controlled frequency power to the starter/generator to operate said starter/generator as a starter;
    the contactors providing for selective decoupling of the two matrix converters; and
    the two decoupled matrix converters simultaneously receive power flow from the starter/generator operating as a generator providing power in a reverse direction, with one matrix converter delivering constant frequency power for constant frequency electrical loads in the aircraft and the other matrix converter delivering controlled, variable frequency power for controlled, variable frequency electrical loads in the aircraft.

2. The circuit of claim 1, further comprising:
    three inputs carrying a three-phase power input, each input including an inductor circuit for filtering out frequency components on the input of each of the matrix converter; and
    a capacitor coupled in parallel linking two of each of the three inputs, one capacitor coupled between each pair of inputs, and filtering out components on the inputs of each of the matrix converters.

3. The circuit of claim 2, further comprising:
    three capacitors coupled in a triangular array, each one of the three inputs connected to one of three apex formed by connecting the triangular array, and filtering frequency components on the inputs.

4. The circuit of claim 1, further comprising:
    an array of bidirectional switches.

5. The circuit of claim 1, further comprising:
    three outputs from each of the two matrix converters carrying a pulse width modulated power output, each output including an inductor circuit for filtering out frequency components on the output of each of the matrix converters; and
    three capacitors coupled in a triangular array, each of the three outputs connected to an apex formed by connecting the triangular array, and filtering frequency components on the outputs.

6. The circuit of claim 1, further comprising:
    a power output of controlled frequency power flow from one of the matrix converters providing a constant frequency 400 Hz power load or a controlled frequency power load for powering a motor.

7. A matrix converter circuit producing power in an aircraft, comprising:
    a starter/generator of the aircraft;
    a first bidirectional matrix converter for providing AC/AC conversion of variable or constant frequency power delivered by the starter/generator functioning as a generator in a first mode to deliver constant frequency power for first electrical loads of the aircraft;
    a second bidirectional matrix converter, acting simultaneously with the first matrix converter, for providing AC/AC conversion of variable or constant frequency power delivered by said starter/generator functioning as a generator in a first mode to deliver controlled frequency power for second loads of the aircraft;
    the first and second matrix converter for providing AC/AC conversion of power from an external power supply in a second mode to deliver controlled frequency power to said starter/generator functioning as a starter, the first and second matrix converter coupled in parallel to deliver said power; and
    wherein the AC/AC conversion does not comprise AC/DC conversion or DC/AC conversion.

8. The matrix converter circuit of claim 7, further comprising:
    three inputs to each of the first matrix converters and the second matrix converter carrying a three-phase power signal, each input including an inductor circuit for filtering out frequency components of the power signal to each of the matrix converters; and
    at least one capacitor filter coupled in parallel to each of the three inputs filtering out components to each of the matrix converters.

9. The matrix converter circuit of claim 7, further comprising:
    the first matrix converter and the second matrix converter includes an array of bidirectional switches.

10. The matrix converter circuit of claim 7, further comprising:
    three outputs from each of the first matrix converter and the second matrix converter carrying a controlled frequency pulse width modulated power signal output, each output including an inductor circuit for filtering out frequency components on the output of the matrix converters; and at least one capacitor filter coupled in parallel to each of the three outputs filtering out frequency components on the outputs of each of the matrix converter circuits.

11. The matrix converter circuit of claim 7, wherein the first matrix converter powers a motor in the first mode and the second matrix converter powers an electronic component in the first mode.

* * * * *